Figure 1:
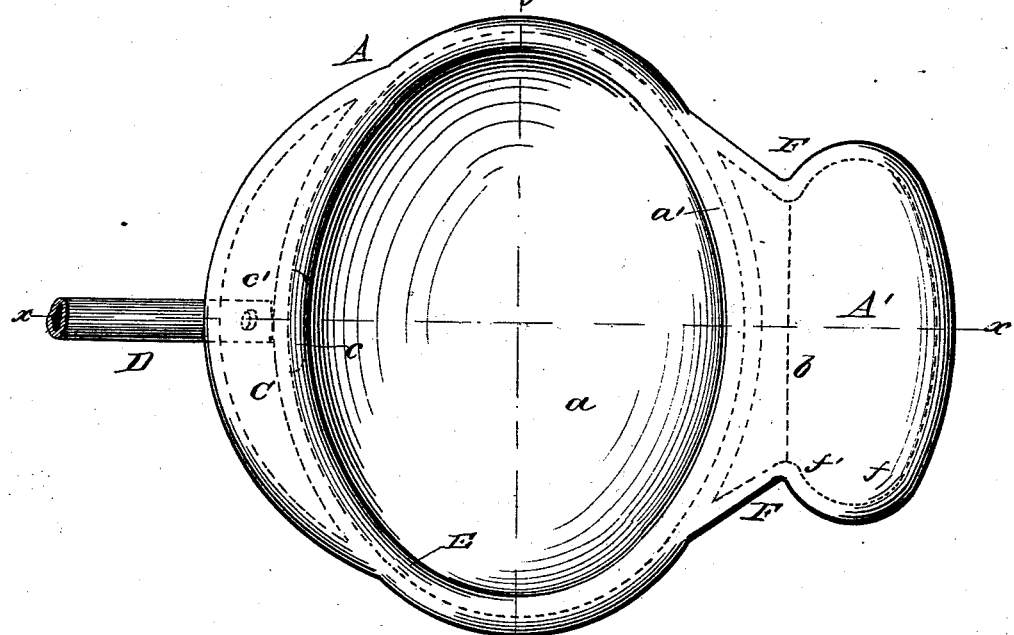

(No Model.)

B. HAVANAGH.
WATER CLOSET.

No. 347,598. Patented Aug. 17, 1886.

WITNESSES
Phil. L. Dietrich.
Robert Emett.

INVENTOR
Bernard Havanagh
By
Attorney (No Model.) 2 Sheets—Sheet 2.

B. HAVANAGH.
WATER CLOSET.

No. 347,598. Patented Aug. 17, 1886.

WITNESSES
INVENTOR
Bernard Havanagh.
By
Attorney

UNITED STATES PATENT OFFICE.

BERNARD HAVANAGH, OF NEW YORK, N. Y.

WATER-CLOSET.

SPECIFICATION forming part of Letters Patent No. 347,598, dated August 17, 1886.

Application filed May 26, 1886. Serial No. 203,308. (No model.)

*To all whom it may concern:*

Be it known that I, BERNARD HAVANAGH, a citizen of the United States, residing at New York city, in the county of New York and State of New York, have invented certain new and useful Improvements in Water-Closets; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to that class of water-closets known as "wash-out" closets; and the novelty consists in the construction, arrangement, and adaptation of parts, as will be more fully hereinafter set forth and specifically pointed out in the claims.

A great fault with this class of closet has been that the basin did not contain a sufficient quantity of water to prevent the basin from becoming foul, and the water-feed has not been properly proportioned to insure a thorough cleansing of the basin. I have discovered that a depth in the basin of less than two and a half inches will not serve the desired purpose, and I have worked out practically a construction whereby I may provide that or a greater depth, and at the same time have so proportioned the feed-inlets that the basin will be entirely cleansed at each operation of the valve.

I provide a basin having a water-holding concave of an area slightly larger than that of the seat-hole, and with the escape-passage arranged beneath the cover and out of sight. I provide that water may be admitted to wash out the concave by force and to flush the sides of the basin. So far, however, the invention is not new with me, as such a construction is shown in English Patent No. 2,969 of 1883. I provide an auxiliary chamber adjacent to the side of the basin opposite the discharge, the capacity of which approximately corresponds with that of the basin-concave, in order that, after the valve is closed, there will be sufficient water in the auxiliary chamber to fill the concave without "head." I provide that the feed-water shall pass in an inclined plane directly to a long narrow inlet-passage arranged slightly above the water-level in the concave, in order that the first force of admitted water will be directly upon the water in the concave, ordinarily the soiled water, and that the remaining force of water after the auxiliary chamber is full will serve to flush and cleanse the inner surface of the basin. To accomplish this successfully requires peculiar and arbitrary proportions to be given to the water-passages.

With this general statement of the improvement I refer to the accompanying drawings, which form a part of this specification, and in which—

Figure 2:
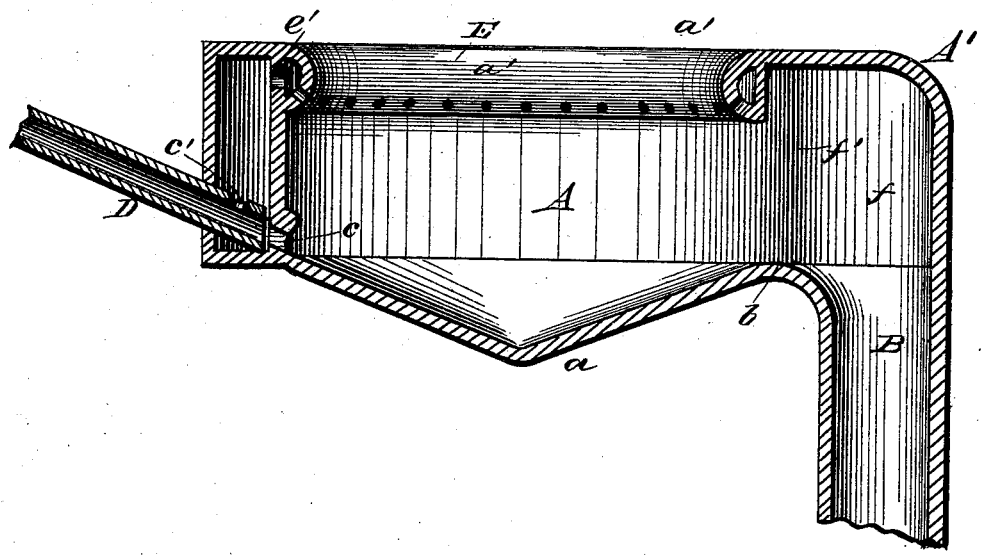
Figure 3:
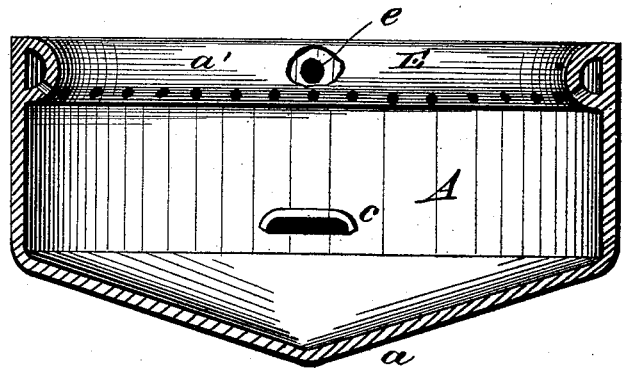
Figure 4:
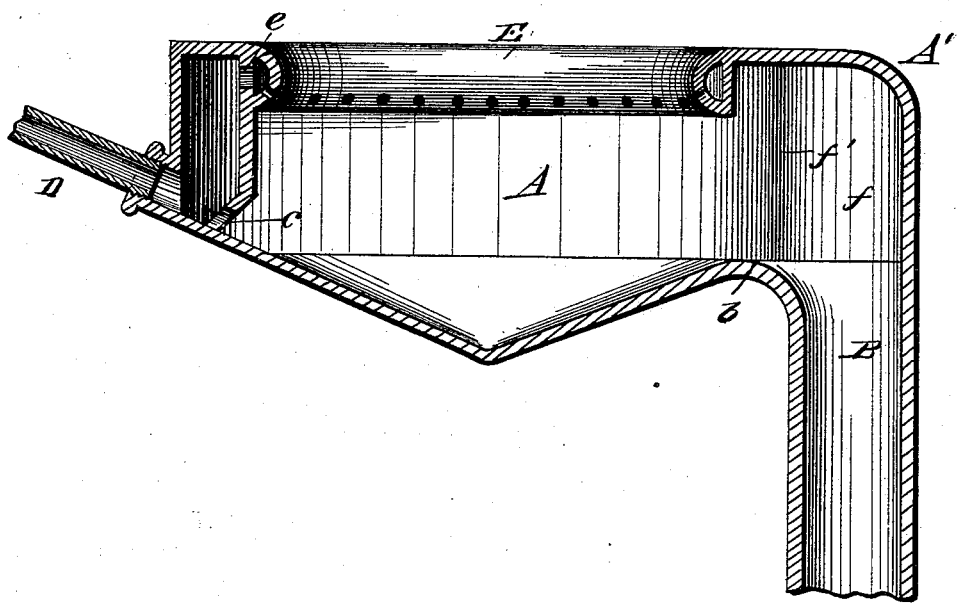

Figure 1 is a top plan view of my improved closet. Fig. 2 is a longitudinal vertical section, and Fig. 3 a transverse section. Fig. 4 is a longitudinal vertical section of a modification.

In the drawings, A designates the basin having a water-holding concave bottom, $a$, of an area slightly larger than that of the seat-hole $a'$ and arranged fairly beneath said hole.

B designates the discharge-passage arranged outside of the hole-area, so as not to be visible in the ordinary use of the closet. The concave is slightly oval, and is so formed that a force of water from the inlet $c$ will tend to throw the contents over the bridge $b$, which lies between the concave and the discharge B.

The seat is arranged transverse to the direction of the water-flow, with the water-inlet upon one side and the discharge B upon the other. This economizes space and makes the arrangement compact and convenient. Above the discharge-pipe B the part of the basin marked A' is expanded to form side chambers, $f$, and shoulders $f'$, adjacent to the line of the bridge $b$. These parts perform important functions. The water is expelled from the concave by force, and when it strikes the face of the basin it is liable to spatter back, and this backflow is liable to impede the proper cleansing. By my construction the water as it strikes the inner face of the basin above the discharge becomes separated and dashes to each side within the recesses $f$. The shoulders $f'$ prevent such dashing water from again reaching the concave. To provide these recesses and shoulders the basin is contracted upon the line of the bridge $b$, as indicated at F.

Upon the side of the basin A opposite the discharge B is a distributing-chamber, C, having a capacity corresponding with that of the concave a, and having its wall adjacent to the basin provided with a long narrow water-passage, c, slightly above the standing water-level, and a water-passage, e, in the upper part, which connects with the flushing-rim E.

The water-inlet pipe D, I preferably arrange at an angle nearly corresponding to that of the adjacent side of the concave. I show it as extending through the chamber C and connecting with the water-passage c, having within the chamber C openings c', which connect the interior of the pipe with the interior of the chamber. The proportions of these water-passages are important. That of the pipe D being, say, of a diameter of one and a quarter inch, the passage c should be one inch long by one-fourth of an inch wide, in order to carry a head sufficient to insure the displacement of the soiled water in the concave, while that of the passage e should be a scant half-inch diameter; the combined area of the two passages c and e being less than that of the feed-pipe D. The size of the passage or passages c' may be adjusted within wide limits.

In the operation of my closet, the ordinary valve (not shown) having been opened, the water under force will pass through the pipe D directly to the passage c, where it becomes spread and operates upon the contents of the concave with a force sufficient to force such contents (the soiled water and solid matter) over the bridge b. Meanwhile the water has passed through the passage c', has filled the chamber C, and has passed into the flushing-rim E; but by the time this cleansing operation is well under way the solid and foul matter has passed over the bridge to the discharge. After the valve is closed the chamber C will hold sufficient water to just fill the concave.

Instead of passing the pipe D through the chamber C, I may arrange the bottom of the chamber C at the desired incline, the object in either case being that the first of the water will act as a ram upon the contents of the concave. I deem the chamber C important in this construction. By this arrangement of water-feeding and water-controlling devices I may employ a concave three inches deep, or deeper at the portions where the solid matter is deposited. This depth of water insures that the bowl shall be kept clean, and by my device this amount of water will be expelled at each working of the valve.

Modifications in details of construction may be made without departing from the principle or sacrificing the advantages of my invention, the essential features of which have been set forth.

What I claim as new is—

1. In a water-closet substantially as described, the combination, with the bowl A, having concave a, located beneath the seat-hole, and having bridge b, separating said concave from the discharge, of the distributing-chamber C, having a capacity corresponding with that of the concave and located but slightly above the concave, and water-connections, as D c c', whereby water sufficient to fill the concave is always held in position to drip therein after the valve has been closed, as set forth.

2. In a water-closet, as described, the combination, with the basin A, having concave a, with bridge b, and with the distributing-chamber C, having water-passages e' and c, of the pipe D, connecting with the passage c, and having passages c' opening within the chamber C, as set forth.

3. The basin A, having concave a and discharge B, separated by a bridge, combined with water-inlet D c, and with shoulders or abutments for preventing back-dash, as set forth.

4. The concave a, bridge b, and discharge B, extending across the seat, combined with the water-inlet upon the side of the seat opposite the discharge, the basin being contracted at F to provide shoulders f' at points on a line with the bridge, as set forth.

5. The closet described, consisting of the basin A A', contracted at F to form shoulders f' and recesses f, and having concave a and bridge b, the water-inlet upon one side of said basin, and the discharge upon the opposite side, the whole arranged to throw the expelling water crosswise to the plane of the seat, as set forth.

In testimony whereof I affix my signature in presence of two witnesses.

BERNARD HAVANAGH.

Witnesses:
H. CLAY SMITH,
PETER HAVANAGH.